(12) United States Patent
Elkan (10) Patent No.: US 7,200,606 B2
(45) Date of Patent: Apr. 3, 2007

(54) METHOD AND SYSTEM FOR SELECTING DOCUMENTS BY MEASURING DOCUMENT QUALITY

(75) Inventor: Charles Elkan, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 455 days.

(21) Appl. No.: 10/004,514

(22) Filed: Nov. 2, 2001

(65) Prior Publication Data

US 2002/0055940 A1 May 9, 2002

Related U.S. Application Data

(60) Provisional application No. 60/246,630, filed on Nov. 7, 2000.

(51) Int. Cl.
    *G06F 17/30* (2006.01)
(52) U.S. Cl. .......................................... 707/102; 707/3
(58) Field of Classification Search .................... 707/5, 707/102, 100, 1, 3
    See application file for complete search history.

(56) References Cited

U.S. PATENT DOCUMENTS

| | | | |
|---|---|---|---|
| 5,724,567 A | | 3/1998 | Rose |
| 5,835,087 A | | 11/1998 | Herz |
| 5,983,246 A | * | 11/1999 | Takano .......................... 715/514 |
| 5,999,932 A | | 12/1999 | Paul |
| 6,020,883 A | | 2/2000 | Herz |
| 6,029,195 A | | 2/2000 | Herz |
| 6,070,157 A | | 5/2000 | Jacobson |
| 6,112,203 A | | 8/2000 | Bharat |
| 6,119,114 A | | 9/2000 | Smadja |
| 6,137,911 A | | 10/2000 | Zhilyaev |
| 6,182,066 B1 | * | 1/2001 | Marques .......................... 707/5 |
| 6,233,575 B1 | * | 5/2001 | Agrawal et al. ................ 707/6 |
| 6,236,768 B1 | | 5/2001 | Rhodes |
| 6,236,978 B1 | | 5/2001 | Tuzhillin |

(Continued)

OTHER PUBLICATIONS

Rennie, Jason, ifile: An Application of Machine learning to E-Mail Filtering, Text Mining Workshop, Boston, MA USA http://www.ai.mit.edu/ ~jrennie/ifile.

(Continued)

*Primary Examiner*—Jeffrey Gaffin
*Assistant Examiner*—CamLinh Nguyen
(74) *Attorney, Agent, or Firm*—Greer, Burns & Crain, Ltd.

(57) ABSTRACT

A system and method for document filtering and selection based on quality automatically operates to make value judgments for document retrieval. Items of data, e.g. documents, are automatically associated a value. Items of data may be then selected based upon value, which is not only for the specific subject or topic requested, but also desirable according to certain criteria, including each document's quality. A specific application of the invention is to a filter for computerized bulletin boards. Many of these systems, also known as discussion groups, have thousands of new messages per day. Readers and human editors do not have time to classify new messages by quality quickly. Messages may be ranked by quality automatically, to perform the same function performed by a human editor or moderator. Values and qualities may be assigned by interestingness, appropriateness, timeliness, humor, style of language, obscenity, sentiment, and any combinations thereof, for example.

25 Claims, 9 Drawing Sheets

U.S. PATENT DOCUMENTS 6,263,364 B1     7/2001    Najork
6,292,894 B1     9/2001    Chipman
6,460,034 B1 * 10/2002    Wical ............................ 707/5
6,675,161 B1 *  1/2004    Suchter ......................... 707/5

OTHER PUBLICATIONS

Webming Text Classification System, printed Oct. 15, 2001, http://www.webmind.com/productstfdoc.html.

* cited by examiner

METHOD AND SYSTEM FOR SELECTING DOCUMENTS BY MEASURING DOCUMENT QUALITY

CROSS REFERENCE TO RELATED APPLICATIONS

This patent was originally filed as Provisional Patent Application Ser. No. 60/246,630 filed Nov. 7, 2000 and titled, "Method and System For Selecting Documents By Measuring Quality."

FIELD OF THE INVENTION

The present invention relates to a system and method for classifying and selecting documents according to a set of criteria in order to select the most desirable documents of a group.

BACKGROUND OF THE INVENTION

With the advent of modern technology, including the Internet a wealth of information is available to computer users. Users can automatically retrieve a multitude of different documents by searching the Internet. However, the wealth of information has become so overwhelming that there is a need to organize, classify and filter information according to different criteria.

It is common for computer users connected to the Internet to utilize web browsers and search engines to locate web pages of particular interest. Search engines, such as Google, index hundreds of millions of web pages maintained by computers all over the world. The users compose queries, and the search engine identifies pages that match the queries according to the subject matter of the pages.

In many instances, particularly when a query is short, broad, or not well defined, the result set can be overwhelmingly large, for example thousands of pages. Furthermore, many of the pages returned are irrelevant and not of a quality suitable to provide the desired information. This is because "quality" is in practice impossible to define in general, whether explicitly, or through a series of steps of a computer program.

Many companies and researchers have developed methods that use the text of a document to identify its topic automatically. This process is called text categorization or text classification. For example, a press release may be categorized automatically as concerning the computer industry or the automobile industry. Such methods of test classification group articles or documents according to subject matter, not quality.

Some ranking approaches utilize user feedback. These approaches require users to supply relevance information to iteratively improve ranking. However, studies have shown that users are generally reluctant to provide relevance feedback. Within the context of email, it is also known in the art to utilize text routing or filtering in order to classify and select messages. This is the process of deciding where or to whom to send a message or document. Such a classification system utilizes criteria based on the desired recipient. One common application of text filtering is to identify low-priority email messages automatically. The purpose of such methods is generally to identify unsolicited commercial email. For instance, unwanted advertising has become a problem endemic to email, with users receiving vast amounts of unwanted email, known as 'spam'. Such documents are undesirable because of the lack of the recipient's interest in receiving such correspondence.

It is also known within the art that many email carriers may automatically filter such correspondence. For instance, the Hotmail service of Microsoft may categorize messages that are sent to a number of emails, rather than to a single recipient, into a folder marked "Bulk Mail". While the intended recipients may desire to read such emails, they are categorized and placed in a different folder automatically because of the number of intended recipients or the sender's email identity. While sorting according to the identity of the sender or number of recipients represents an advancement in the art, this still is problematic in that it only applies to email, and does not provide a fine-grained ranking of messages. A few companies and researchers have software methods that attempt to predict how an individual user will perceive the relevance of a document. The major drawback of these methods is that they require detailed information about the preferences of each user in order to be beneficial for that user.

Learning processes are also known within the art, wherein a program is capable of learning or remembering which documents may be preferred by a user. However, to date these technologies have faced similar problems in that they are generally topic based, or user/recipient based. This is to say documents are desirable or undesirable because of their subject matter or because of the sender or receiver's identity. So, while such processes represent advancements, there is a need for a system and method that utilizes a learning process in order to select documents according to their quality, rather than topic or user/recipient identity.

Another problem with the aforementioned technology is that because of the sheer amount of information being delivered, it is impractical for wireless and telephony applications. In many of these applications, bandwidth for transmitting information to a device is limited or expensive or both. Additionally, many of these applications use devices, whether screen based or voice based or other, that can only present a limited amount of information to the user. By filtering and limiting the result set of a query to only information of a high quality, as performed by the invention described herein, the restricted bandwidth and restricted presentation capacity can be used more efficiently.

There also exists a need for a method and system capable of filtering documents according to their quality when not connected to the Internet. For instance, many companies with a vast array of internal documents may desire to select certain documents not only according to their subject matter, but also their quality.

PRIOR ART

U.S. Pat. No. 5,724,567 issued to Rose discloses, "A System for Directing Relevance Ranked Data Objects to Computer Users." The '567 patent discloses an information access system which stores items of information in an unstructured global database. When a user requests access to the system, the system delivers to that user an identification of only those items of information which are believed to be relevant to the user's interest. The determination that items of information are relevant to a user is carried out by ranking each available item in accordance with any one or more techniques. In one approach, the content of each document is matched with an adaptive profile of a user's interests. In another approach, a feedback mechanism is provided to allow users to indicate their degree of interest in each item of information. These indications are used to determine whether other users, who have similar or dissimilar interests, will find a particular item to be relevant. The '567 patent is burdensome for human users because it requires users to create personal profiles.

U.S. Pat. No. 5,999,932 issued to Paul discloses, "A System and Method For Filtering Unsolicited Electronic Mail Messages Using Data Matching and Heuristic Processing." The '932 patent discloses a system for eliminating unsolicited electronic mail which generates and stores a user inclusion list including identification data for identifying email desired by the user. Data from one or more fields of incoming electronic mail messages are compared with the identification data stored in the user inclusion list. If the electronic mail message data matches corresponding identification data from the user inclusion list, the email message is marked with a first display code, such as "OK." If no match is detected, the system performs at least one heuristic process to determine whether the electronic mail message may be of interest to the user. If the message satisfies one or more criteria as determined by the heuristic process and is therefore of potential interest to the user, the message is marked with a second display code, such as "NEW." If the email message does not satisfy any of the heuristic criteria, the message may be marked with a third display code, such as "JUNK." The processed messages are displayed to the user in a display mode corresponding to the display codes respectively assigned to the messages. The '932 patent represents a significant advancement in the filtering of unwanted email. However, the '932 method is not well suited for filtering a wide variety of different types of documents. Also, the criteria used by the heuristic process must be programmed explicitly, which is difficult and tedious. As mentioned above, in general quality cannot be defined explicitly.

U.S. Pat. No. 6,112,203 issued to Bharat discloses, "A Method for Ranking Documents in a Hyperlinked Environment Using Connectivity and Selective Content Analysis." The '203 patent discloses a computerized method of ranking documents according to their content and their connectivity by using topic distillation. The documents include links that connect the documents to each other, either directly, or indirectly. A graph is constructed in a memory of a computer system. In the graph, nodes represent the documents, and directed edges represent the links. Based on the number of links connecting the various nodes, a subset of documents is selected to form a topic. A second subset of the documents is chosen based on the number of directed edges connecting the nodes. Nodes in the subset are compared with the topic to determine similarity to the topic, and a relevance weight is correspondingly assigned to each node. Nodes in the second subset having a relevance weight less than a predetermined threshold are pruned from the graph. The documents represented by the remaining nodes in the graph are ranked by the connectivity based ranking scheme. Many similar methods are well known in the art which rank documents according to their subject matter or topic as relevant to the desired subject matter. However, there still exists a need to further filter the documents according to their inherent quality as opposed to topic.

U.S. Pat. No. 6,119,114 issued to Smadja discloses, "A Method and Apparatus for Dynamic Relevance Ranking." The '114 method includes the step of registering a profile. As discussed previously this can be time consuming and cumbersome for the user. Once the profile is established, a newly received document is dynamically filtered with the profile. Registration is performed by entering the profile. The training data is searched by determining the relevance, not quality, of documents in the training data. The documents in the training data are ranked to form a list.

U.S. Pat. No. 6,137,911 issued to Zhilyaev discloses, "A Text Classification System and Method." The '911 patent discloses classifying documents into one or more clusters corresponding to predefined classification categories by building a knowledge base comprising matrices of vectors which indicate the significance of terms within a corpus of text formed by the documents and classified in the knowledge base into each cluster. The significance of terms is determined assuming a standard normal probability distribution, and terms are determined to be significant to a cluster if their probability of occurrence being due to chance is low. For each cluster, statistical signatures comprising sums of weighted products and intersections of cluster terms to corpus terms are generated and used as discriminators for classifying documents. The knowledge base is built using prefix and suffix lexical rules, which are context-sensitive and applied selectively to improve the accuracy and precision of classification. In this invention the clusters are according to topic, not quality.

U.S. Pat. No. 6,236,768 issued to Rhodes discloses, "A Method and Apparatus for Automated, Context-Dependant Retrieval of Information." The '768 patent discloses storing documents in a database, and searching these document for relevance to contextual information, instead of similar text. Each stored document is indexed by meta-information specifying contextual information about the document. Current contextual information is acquired, either from the user or current computational or physical environment, and this "meta-information" is used as the basis for identifying stored documents of possible relevance.

U.S. Pat. No. 6,236,978 issued to Tuzhilin discloses, "A System and Method for Dynamic Profiling of Users in One-to-One Applications." The '978 patent utilizes a static and dynamic profile. The static profile includes factual user information. The dynamic profile includes dynamic rules, which correspond to transactional information of the user. The method and system compresses the dynamic rules into aggregated rules so that the user can view a comparatively small number of the aggregated rules and select the desired rules from the aggregated rules based on user-desired criteria. The dynamic rules associated with the particular user are matched to the selected desired aggregated rules to generate the dynamic profile. The static and dynamic profile are then combined to form the user profile. The system and method can be used in conjunction with a Personal Shopping Assistant system and a Personal Intelligent Digital Assistant system. The system uses profiles of users, not of documents.

U.S. Pat. No. 6,029,195 issued to Herz discloses, "A System for Customized Electronic Identification of Desirable Objects." The '195 patent discloses a "target profile" for each target object, and a "target profile interest summary" for each user which describes the user's interest in various types of target objects. One major drawback of this system is that each "interest summary" is for one user, and requires specific information about that user.

The classification system called PurpleYogi developed by a company now named Stratify is also known within the art. The PurpleYogi classification system identifies the main ideas in text or documents, models these ideas mathematically using algorithms, keywords, and business rules, and classifies documents or text-based information into a hierarchy of topics by comparing the document to the model definition of the topic. Once again this system fails to measure the overall quality of documents and requires burdensome personal profiles for users.

Other similar technology is also known within the art. Software developed by a company named PingPong categorizes and classifies content and data hierarchically, using artificial intelligence algorithms. Like PurpleYogi, the PingPong software categorizes and classifies content and data hierarchically by analyzing themes and main ideas in text, using artificial intelligence algorithms. PingPong technology also classifies information according to similar topics, not overall quality.

Accordingly, there exists a need for an scalable, fully server-side, easy to use, automatic, system to filter documents and text according to their quality that is suitable for use on-line and off-line, and suitable for use with a multitude of different client devices including those with limited bandwidth and restricted presentation capacity.

OBJECTS OF THE INVENTION

It is a purpose of the present invention to provide a system and method for document filtering and selection based on quality. This will save the client, or user, from having to manually examine each document to determine its quality. Rather the steps disclosed herein provide a system and method for a client to request information and that information will be delivered which is not only for the specific subject or topic requested, but also desirable according to certain criteria, including each document's quality.

It is further a purpose of the present invention to be utilized with computerized bulletin boards. Many of these systems, also known as discussion groups, have thousands of new messages per day. Readers and human editors do not have time to classify new messages by quality quickly. The present invention allows messages to be ranked by quality automatically, and performs the same function performed by a human editor or moderator.

Also, the present invention is particularly well suited for devices including those with limited bandwidth and restricted presentation capacity. Because the present invention only provides those information items that are of particular value, the number of documents downloaded is fewer and therefore the application works much better with devices of limited bandwidth such as wireless email devices, personal digital assistants (PDAs) and mobile phones.

It is further a purpose of the present invention to provide a method and system for measuring many other qualitative characteristics of a document. For instance, with respect to financial articles it may be desirable to determine if the article is written in the style of a reputable newspaper, versus in a colloquial style, or bullish in sentiment versus bearish. It may also be desirable to determine if the article is written in the style of a corporate insider, versus in the style of an outside analyst. For other types of document, it may be desirable to determine if the document is humorous, or obscene.

SUMMARY OF THE INVENTION

The present invention relates to a system and method for classifying documents in order to select the most desirable documents of a group. Because quality is very difficult to distinguish by anyone other than a human being, this invention provides a system and method that learns a profile of what constitutes quality, then utilizes this profile to allow a user to retrieve information that is desirable. A client is provided with items of data selected according to estimates computed using a profile of certain high-level criteria such as quality, interestingness, appropriateness, timeliness, humor, style of language, obscenity, sentiment, and any combinations thereof. These estimates are computed using the profile from low-level criteria such as length, vocabulary, fraction of words spelled correctly, title, author, reading grade level, average length of sentences, average length of words, usage of punctuation, usage of grammar, formatting, capitalization, source, display tags. Profiles are learned automatically from labeled training examples.

This system also relates to a method of obtaining and automatically associating a value to an item of data by obtaining items, obtaining labels for some items, selecting items of data with certain labels to form training sets, learning a profile using the training sets, and associating a value to other items of data using said profile. As such, the program is capable of learning, which items of are high quality and is capable of delivering those items of data, which would be of interest to the client.

Therefore, in accordance with the present invention, a system is provided which measures the quality of documents. It is assumed that the documents are stored at one or more locations in a data communication network on data storage media associated with a computer system. Using the quality measurements, the service displays only the messages that are most worth reading or otherwise processing by clients. By way of example this may include a web-based information service for investors that may measure the quality of messages from online bulletin boards where investors discuss specific securities. Using the quality measurements the service displays the messages that are of the highest quality, and therefore the most desirable, and most worth reading. The high-level criteria utilized to select which materials are the most desirable may include criteria such as levels of quality, interestingness, appropriateness, timeliness, humor, style of language, obscenity, sentiment, and any combinations thereof. High-level criteria are measured automatically using a profile and low-level features of the Low-level features include length, vocabulary, fraction of words spelled correctly, title, author, reading grade level, average length of sentences, average length of words, usage of punctuation, usage of grammar, formatting, capitalization, source, display tags and any combinations thereof.

The system is organized into several software components, which are also called modules. Each component is either available for public download on the web or may be written using a well-known scripting language called PHP. Anyone skilled in the art will appreciate that the system could be implemented straightforwardly using many other programming or scripting languages. Without limitation, the service could be implemented using Microsoft Active Server Pages (ASP), ColdFusion, Java servlets, Perl CGI scripts, etc.

According to one preferred embodiment, there are six components or modules. The six components are the Downloading Component, the Presenter Component, the Training Component, the Database System, The Learning Component, and the Classifying Component. The first component, the Downloading Component, is a program that downloads existing documents, attaches quality scores to the documents, and saves them in a database along with their quality scores.

The second component, the Presenter Component, generates the pages of information seen by users. This component accepts a request from a user and then retrieves appropriate high-quality documents from the database. The Presenter Component of the service produces web pages that are viewed by human users. Because these pages are produced automatically, they change as time passes and new documents are downloaded.

The third component, the Training Component, produces training sets of high quality and low quality documents by searching the database. Items labeled as exhibiting high quality are stored in one folder, and items of low quality are stored in another folder. Values of low-level features are computed for the items labeled as exhibiting high quality and low quality that are stored in their respective folders. Low-level features may include length, vocabulary, fraction of words spelled correctly, title, author, reading grade level, average length of sentences, average length of words, usage of punctuation, usage of grammar, formatting, capitalization, source, and display tags. According to a preferred embodiment, the items may further be categorized by how old they are. That is, older documents are deemed less desirable than their newer counterparts.

The downloader, presenter, and trainer share some common software functions. The fourth component is a database system. The preferred embodiment uses a well-known publicly available database system named MySQL. Those skilled in the art will recognize that many other relational and non-relational data management systems could be used instead, including but not limited to Oracle or Microsoft SQL Server. The database stores items of data, i.e. messages or documents, and items of data with their values, i.e. quality scores or other measurements of a qualitative characteristic. The Learning Component is a software module whose output is a profile when its input is a training set of documents. According to a preferred embodiment, a well-known publicly available module known as Rainbow, written by Andrew McCallum of Carnegie Mellon University, is utilized. According to a preferred embodiment, the naive Bayesian learning method as implemented in Rainbow, with all default Rainbow parameter settings, is also utilized. The Unix command for creating the quality measurement classifier is simply rainbow -d qualitymodel -index positive/negative/where the folders named positive and negative contain training messages selected by the Trainer Component. The folder named qualitymodel then contains the profile produced by the learning module. Those skilled in the art will appreciate that it is possible to use many other learning modules, based on many other learning algorithms and/or with many other parameter settings.

The sixth component, the Classifying Component, uses the profile generated automatically as the output of the Learning Component. In the preferred embodiment as implemented using Rainbow, the Learning Component and the Classifier Component are implemented as one software module, but doing so is not necessary. According to one preferred embodiment, the classifier software is part of the Rainbow module, while the profile, that is the parameters defining the classifier model, are written by the learner into files in the folder named qualitymodel.

The overall organization of the preferred embodiment is known as a client-server architecture, and specifically as a three-tier client-server architecture. The top tier of this architecture is the software that a user invokes to send requests to the service and to receive information back. For our preferred embodiment this tier is a web browser using the HTML display language and the HTTP communication protocol, for example Netscape Navigator or Microsoft Internet Explorer. Many other display languages and communication protocols could be used, for example VoiceXML for a telephone-based client. The middle tier of the three-tier architecture is the Presenter Component. (The downloader and the trainer are also middle-tier components.) The bottom tier of the architecture is the database system.

Any qualified programmer will understand that other architectures are possible. Different tiers and components can be subdivided or combined. For example, the Presenter Component could be decomposed into two subcomponents, one that handles the logic of which messages should be presented, and another that specifies how messages should appear to the user. An advantage of this decomposed design would be that multiple appearance subcomponents could be combined with a single logic subcomponent. The final recipients of messages may be human users, or other software processes, modules, or agents.

It should be understood, by one skilled in the art, that the drawings depict certain embodiments of the invention and therefore are not to be considered a limitation in the scope of the instant invention, but that these and other advantages of the present invention will be more fully understood by reference to the following detailed description when read in conjunction with the attached drawings in which.

DETAILED DESCRIPTION

According to a preferred embodiment, a system for providing a client with at least one item of data according to said item of data's value is disclosed. This system may have at least one computer system having items of data available, at least one access device for enabling said client to communicate with said computer system, a classifier means effective to automatically associate a value that is indicative of the qualitative nature of the data, to said items of data, a means for a client to provide a request for at least one item of data according to criteria and a transmitting means adapted to present at least one item of data to the client selected according to criteria. These criteria may be any desirable criteria. It is envisioned that they may include quality, interestingness, appropriateness, timeliness, humor, style of language, obscenity, sentiment, and any combinations thereof. The items of data may be a text message, electronic bulletin board type messages and any other type of data known within the art.

The system may be comprised of a Downloading Component for retrieving at least one item of data from a source, a Classifier Component for associating a value to each said item of data using a profile, a Training Component that selects at least one of said items of data according to certain labels, said selected items of data being grouped to form training data, a Learning Component that accepts said training data and automatically creates said profile and a Presenter Component for accepting a request from a client and transmitting said items of data selected according to said values. Also, a database may be used to store items of data, profiles, and training data.

Figure 1:
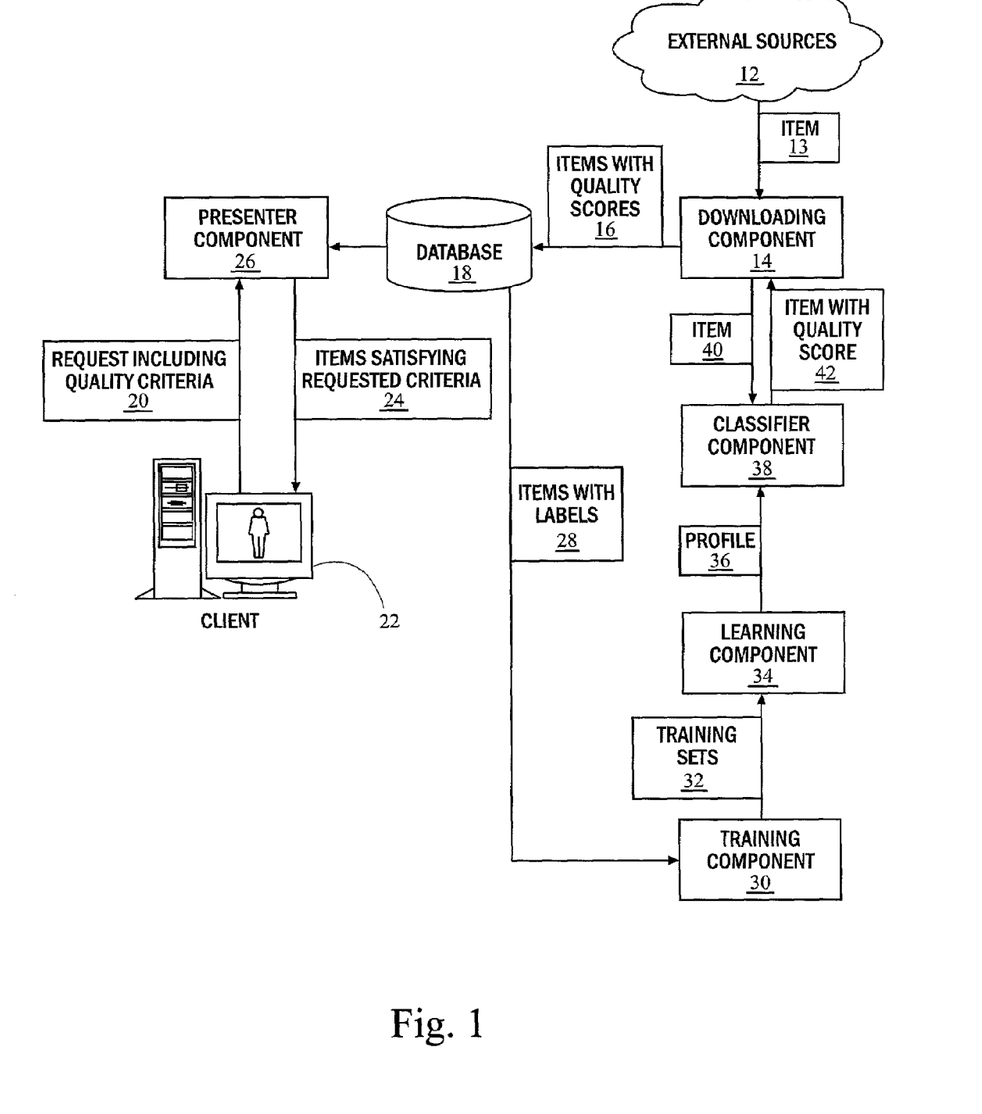
FIG. 1 illustrates a preferred embodiment of the architecture as part of a client-server system according to the present invention.

FIG. 1 depicts the present invention according to a preferred embodiment. Items 10 from a source 12 are downloaded by the Downloading Component 14. The Classifier Component 38 attaches a value to each item 10, to form an item with a value 16. The value is formed using a profile 36, derived from a Learning Component 34. The Learning Component 34 creates profiles by receiving training sets 32 from the Training Component 30. The profiles are then used to classify the items 10 received from the Downloading Component 14. The items with values 16 are transferred to the database 18. When a client 22 requests information, the Presenter Component 26 will deliver items satisfying requested criteria 24. For instance, the client may request information on a particular stock ticker. The present invention will find the highest quality articles according to the criteria learned through the use of the training sets. Therefore, the client will be delivered not only information on the specific topic they are interested in, but also those information items of the highest quality. It is well known within the art that this is merely a preferred embodiment, and many other architectures are possible. For example, different tiers and components can be subdivided or combined. By way of example, the Presenter Component 26 could be decomposed into two subcomponents, one that handles the logic of which messages should be presented and another that specifies how messages should appear to the user.

Figure 2:
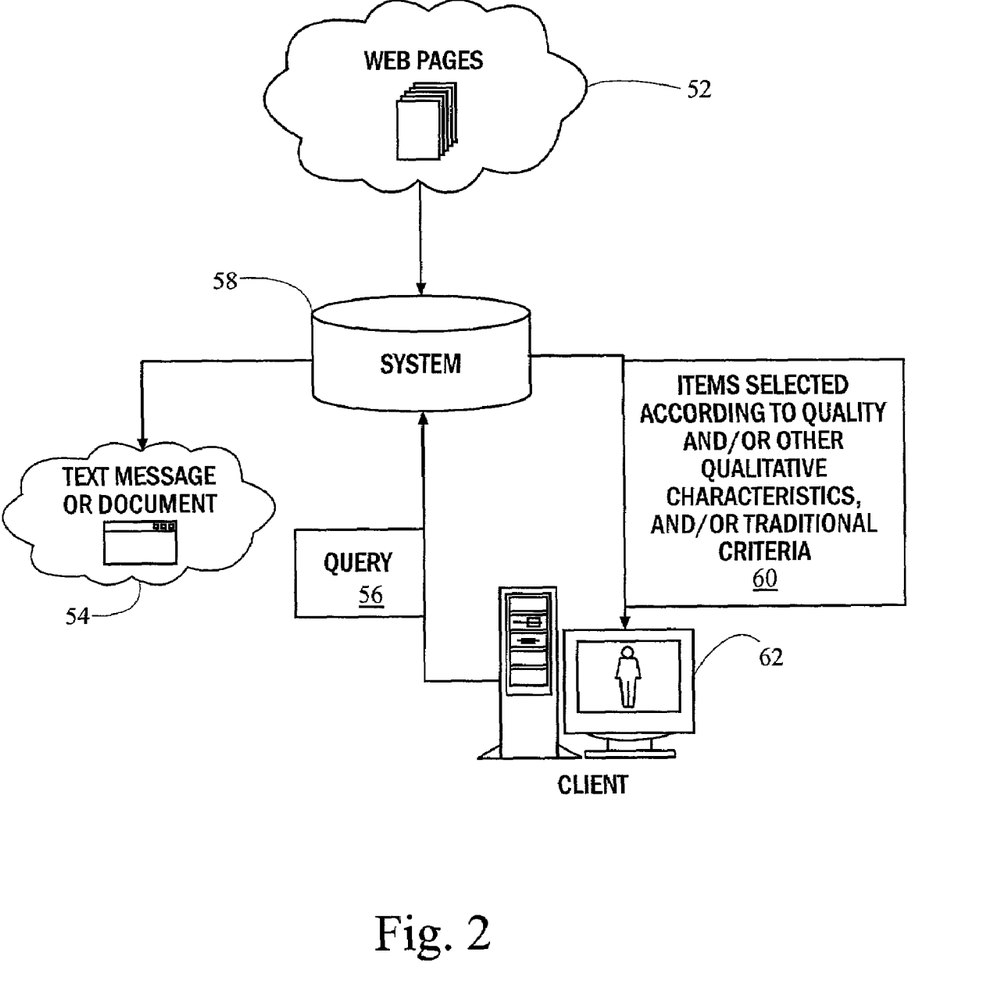
FIG. 2 illustrates the overall system according to a preferred embodiment of the present invention.

According to a preferred embodiment, as shown in FIG. 2, the client 62, requests information through a query 56 to the system 58, which in turn retrieves items 52, delivers the items selected according to topic, quality and timeliness 60.

A method of obtaining and automatically associating a value to an item of data is also envisioned by the present invention. This method comprises the steps of obtaining at least one item of data from a source, obtaining labels for each item of data, selecting items of data with certain labels to form training data, creating a profile from training data and associating a value to at least one of said items of data using said profile. Where an item does not have a label, an estimate may be generated using a profile. The profile may specify said associated value based on low-level features of said item selected from the group consisting of length, vocabulary, fraction of words spelled correctly, title, author, reading grade level, average length of sentences, average length of words, usage of punctuation, usage of grammar, formatting, capitalization, source, display tags and any combinations thereof. The value may be measured according to a quantitative scale of measurement, qualitative scale of measurement and may be categorical. Also, labels may be obtained by a human providing the labels. Labels may be indicative of levels of quality, interestingness, appropriateness, timeliness, humor, style of language, obscenity, sentiment, and any combinations thereof.

Also disclosed is a method of obtaining and automatically associating a value to an item of data, then receiving requests from clients and transmitting at least one item of data according to said requests and said associated values to said client. Further, new items of data may be introduced to said training data and a new profile created. This profile may be automatically generated. Also, a value threshold maybe designated by a client and items of data retrieved only if they meet this value threshold, for instance, documents in the top 10% of all documents by quality.

Figure 3:
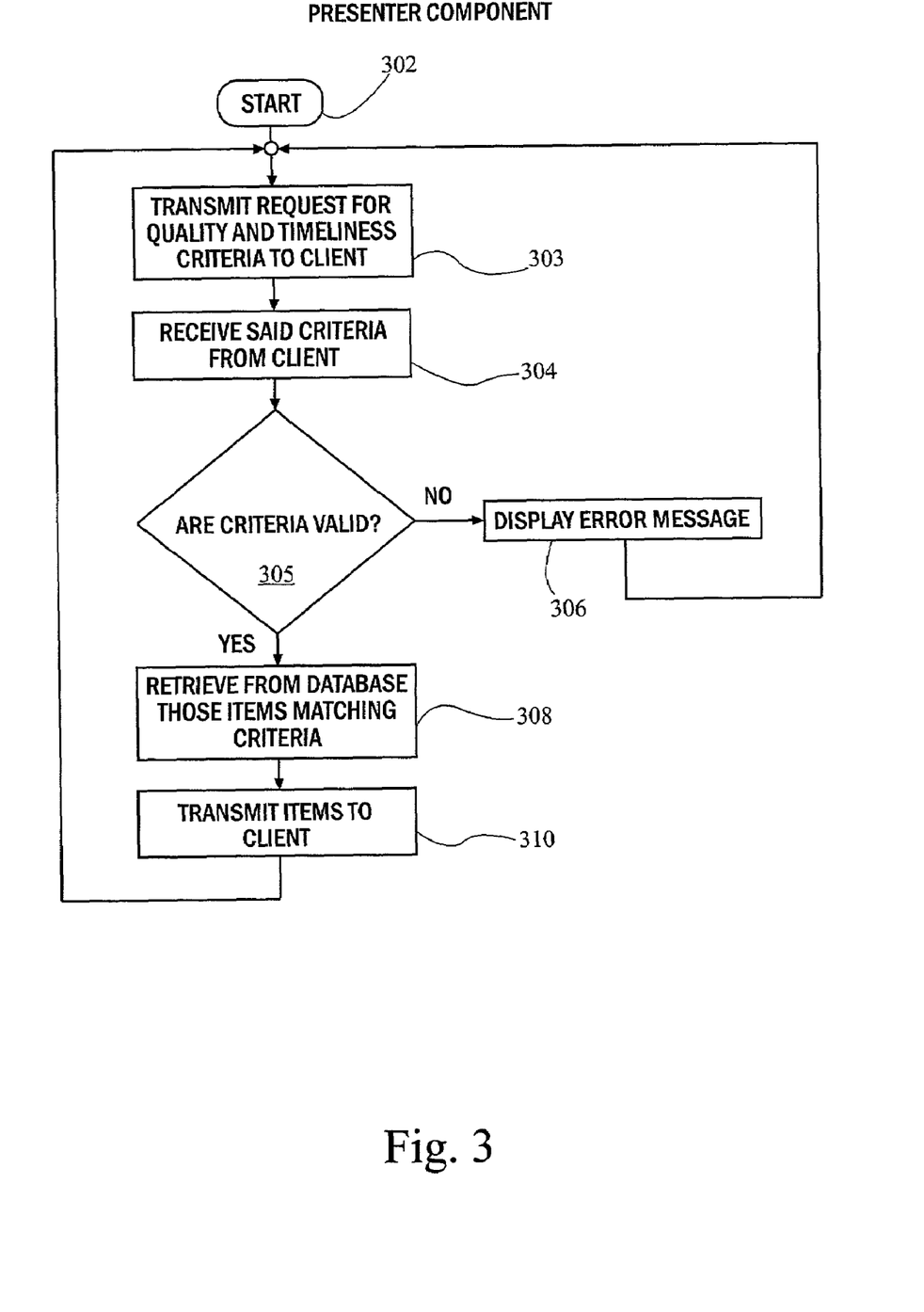
FIG. 3 illustrates The Presenter Component.

Turning now to FIG. 3, a flow diagram of the Presenter Component is depicted. The program starts 302, a request for quality and timeliness criteria is transmitted to the client 303, the client sends said criteria 304. If the criteria are not valid, an error message is displayed 306. If the criteria are valid 305, items matching the criteria are retrieved from the database 308. Once retrieved, items are transmitted to the client 310. After transmitting items to the client, the program returns to start 302.

Figure 4:
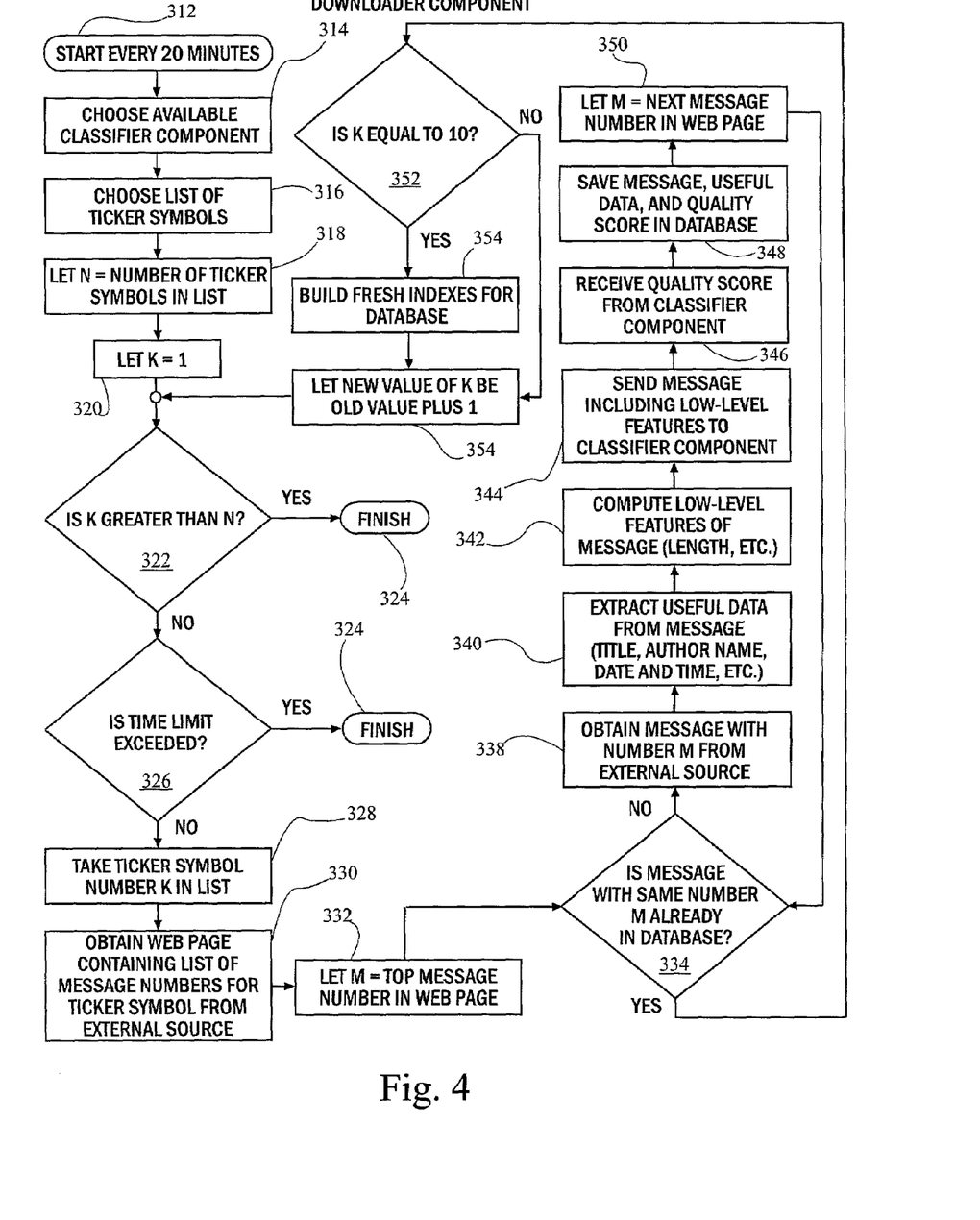
FIG. 4 illustrates The Downloader Component.

The Downloader Component, is a program that downloads existing documents, attaches quality scores to the documents and saves them in a database along with their quality scores. Turning now to FIG. 4, a flow diagram of the Downloader Component is depicted. The Downloader Component may, according to one preferred embodiment, be instructed to start every 20 minutes 312. An available Classifier Component 314 is selected, and a list of ticker symbols is chosen 316. The number of ticker symbols in the list is represented by n 318, and k is set to 1 (320). If k is greater than n, the program is instructed to finish 324. If k is not greater than n, the program must determine whether the time limit has been exceed 326. If the time limit has been exceeded, the program will finish 324. If the time limit has not been exceeded, the program will take ticker symbol number k in said list 328, and download a web page containing a list of message numbers for said ticker symbol from an external source 330. The program will let m be the top message number in the web page 332. If a message with the same number m is already in the database, then the program skips to step 352. If not, the program is instructed to download the message with said number m from said external source 338. Useful data is extracted from said message 340, low-level features of the message are computed 342, the message with its low level is sent to the classifier 344, and the quality score is received from the Classifier Component 346. Then the message, useful data, and quality score are saved in the database 348. The program is instructed to let m be the next message number in the web page 350, and the program returns to step 334 to determine whether the message with same number m is already in the database. If the message is already in the database, the program will determine whether k is equal to 10 (352). If k is equal to 10, fresh indexes for the database 354 will be built. If k is not equal to 10, the new value of k will be k+1, and the program is instructed to return to step 322.

Figure 5:
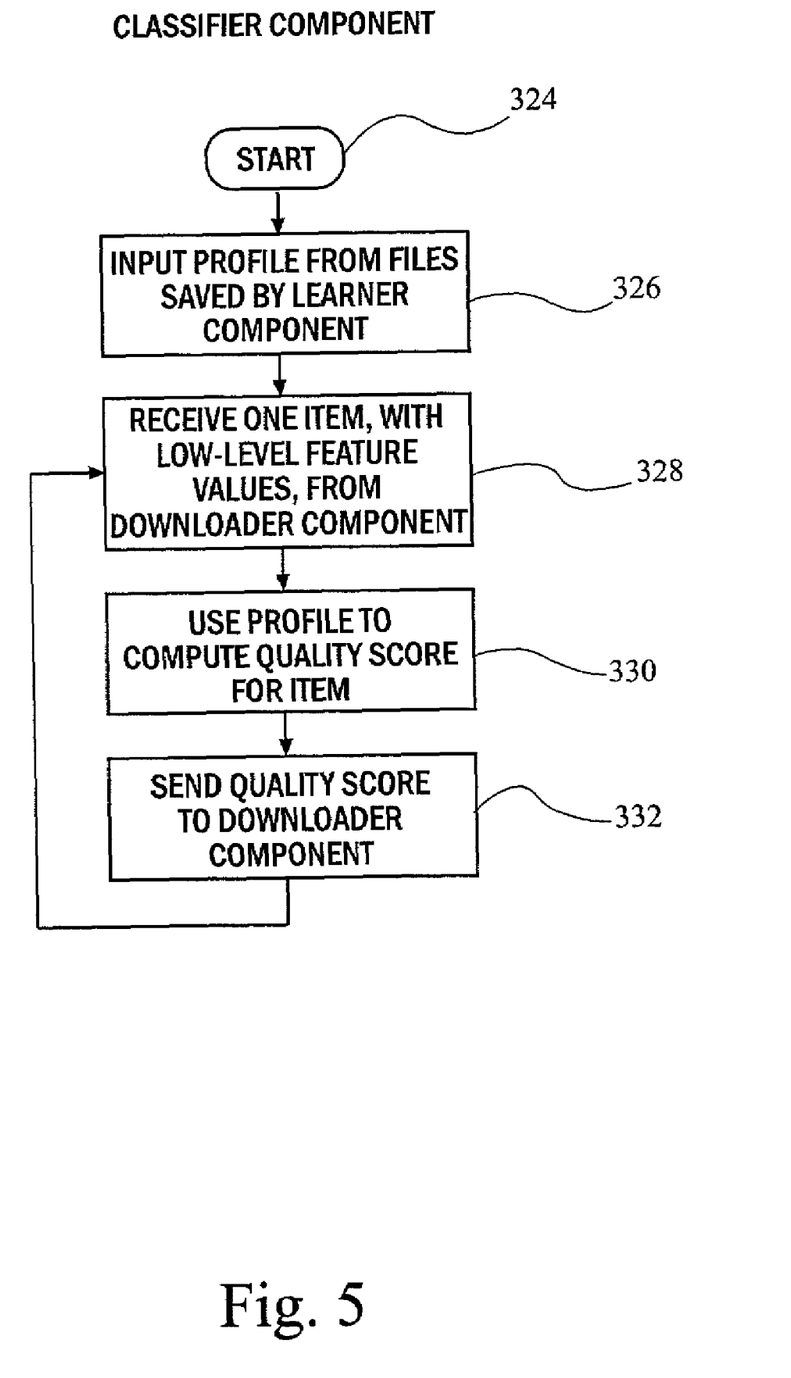
FIG. 5 illustrates The Classifier Component.

The Classifier Component is depicted in FIG. 5. As shown in the diagram, the program starts 324. A profile is inputted from files saved by the Learner Component 326. One item, with its low-level feature values, is received from the Downloader Component 328. Using the profile, a quality score is computed for the item 330. The quality score is then sent to the Downloader Component 332.

Figure 6A:
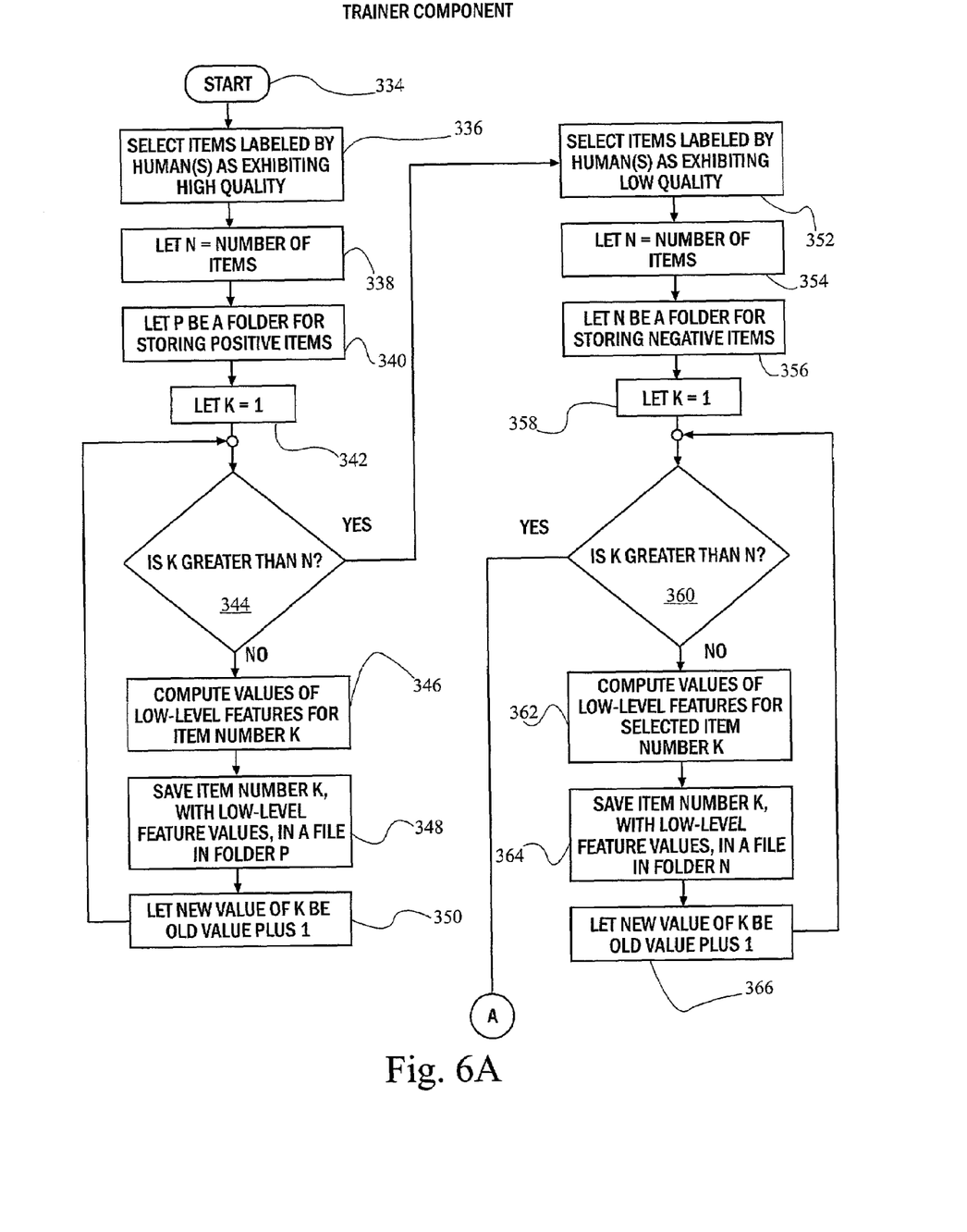
FIG. 6A and FIG. 6B illustrate The Trainer Component.
Figure 6B:
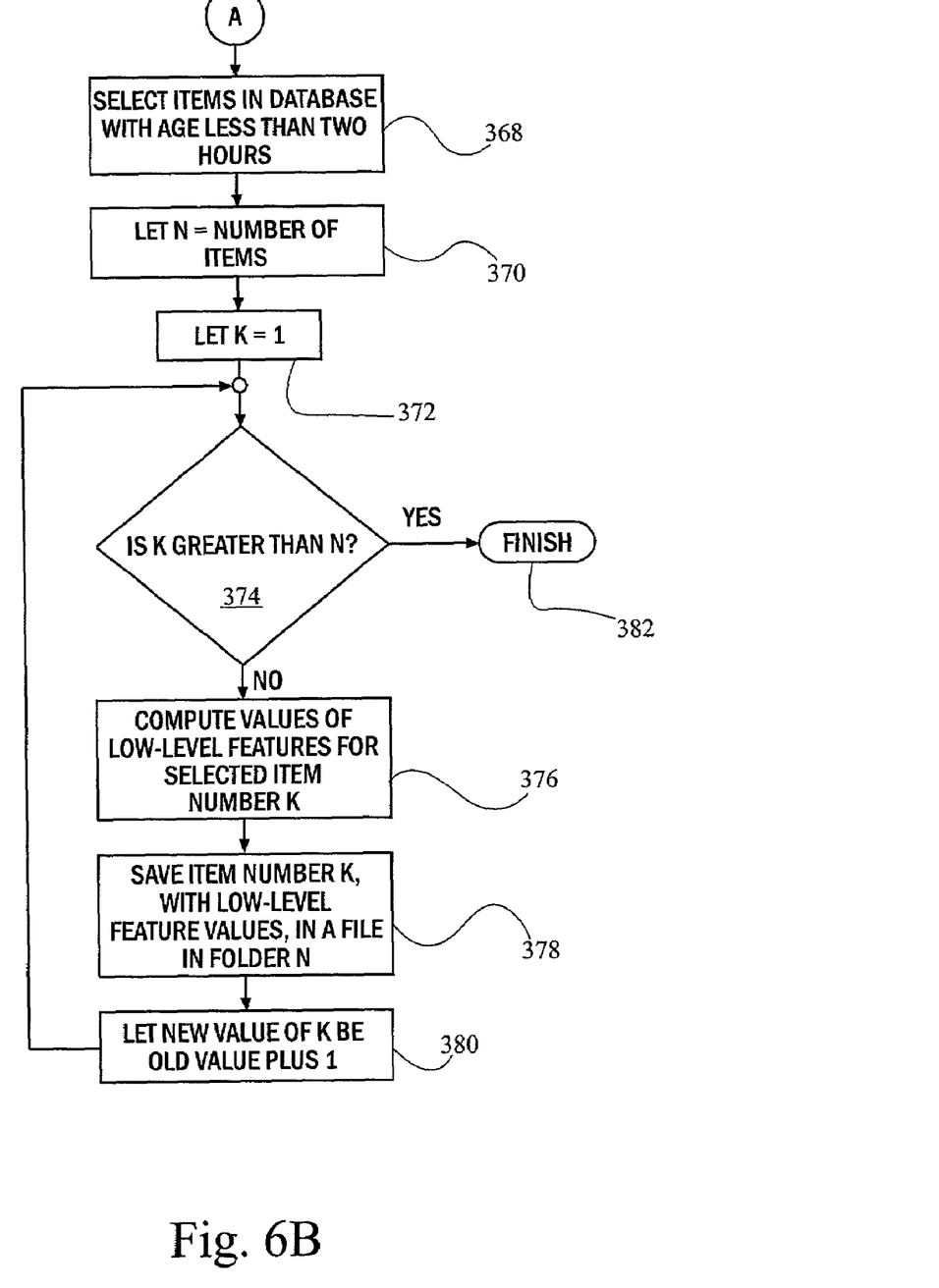

The Trainer Component is depicted in FIG. 6A and FIG. 6B. The program is started 334, and items labeled by humans as exhibiting high quality are selected 336. n is allowed to equal the number of said items 338. P is assigned to be a folder, also called a directory, for storing positive items 340. K is assigned the value 1 (342). The program next determines whether k is greater than n. If k is not greater than n, the program will compute values of low-level features from item number k (346), the item number k will be saved in a file in folder P 348, the new value of k will be k+1 (350), and the program will return to step 344. If k is not greater than n, the program is instructed to select items labeled by humans as exhibiting low quality 352. The program is instructed to let n be the number of said items. N is assigned to be a folder for storing negative items 356, and k is assigned to equal 1 (358). The program must next determine whether k is greater than n (360). If k is not greater than n, the values of low-level features for said selected item number k are computed 362, and the item number k, with said low-level feature values, is saved in a file in said folder N (364). The new value of k is assigned to be the old value plus 1 (366). If k is greater than n, items from the database with an age less than two hours are selected 368. The program is instructed to let n be the number of said items 370. K is assigned to be 1 (372). If k is greater than n, the program will finish 382. If k is not greater than n, values of low level features for said selected item number k (376) are computed. The item number k, is saved with its low-level feature values, in a file in folder N (378). The new value of k is k+1 (380), and the program proceeds to step 374.

Figure 7:
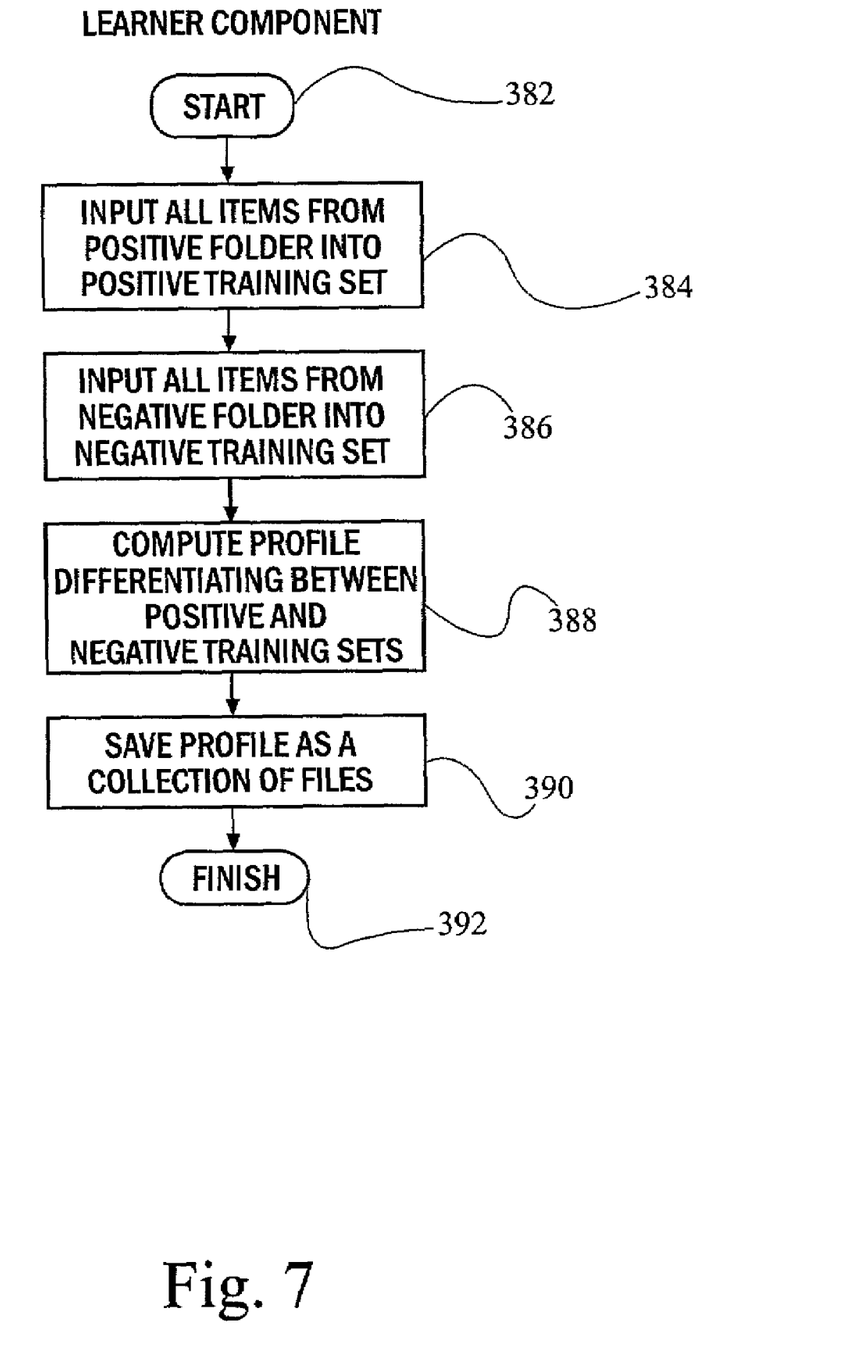
FIG. 7 illustrates The Learner Component.

FIG. 7 depicts a flowchart of the Learning Component. The program starts 382. All items from the positive folder are inputted into positive training set 384, and all items from the negative folder are inputted into negative training set 386. A profile is computed which differentiates between positive and negative training sets 390, the profile is saved as a collection of files 390, and the program is instructed to finish 392.

Figure 8:
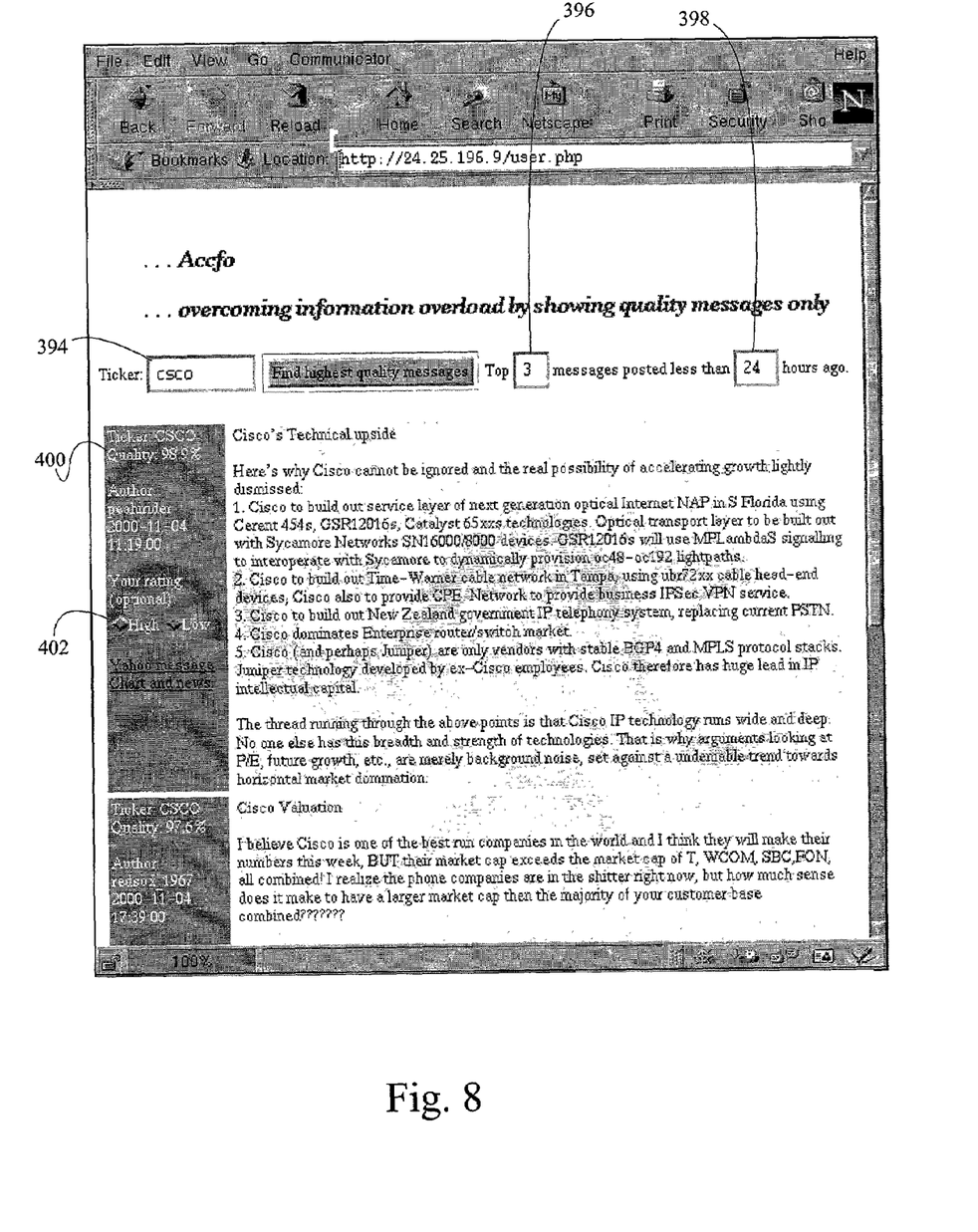
FIG. 8 depicts a preferred embodiment of a user interface according to the present invention.

FIG. 8 depicts a preferred embodiment of the user interface according to the present invention. As shown, the present invention may be used with an electronic bulletin board. According to this embodiment, a user may request a stock symbol 394 (e.g. CSCO) and request a number of messages they wish to receive 396 (e.g. 3) and the timeliness of these articles 398 (e.g. posted less than 24 hours ago). The output will be articles, sorted according to their quality. For instance, the top article shown has a quality score of 98.9% (400). Also, the user may input an optional rating 402. The optional rating 402, may then contribute to the label attached to said item, and be used by the trainer component.

I claim:

1. A system for providing a client data according to a quality value, said system comprising;
    a downloading component for obtaining at least one item of data from a source;
    a classifier component for associating a quality value to each said item of data using a profile, wherein said quality value is based on low-level features of said item of data selected from the group consisting of length, vocabulary, fraction of words spelled correctly, title, author, reading grade level, average length of sentences, average length of words, usage of punctuation, usage of grammar, formatting, capitalization, source, display tags and any combinations thereof;
    a training component that selects at least one of said item of data according to certain labels, said selected items of data being grouped to form training data;
    a learning component that accepts said training data and automatically creates said profile; and
    a presenter component for accepting a request from a client and transmitting said items of data selected according to said quality value.

2. A computer implemented method of obtaining and automatically associating a quality value to an item of data comprising software code for executing the steps of:
    obtaining at least one item of data from a source via a network communication;
    obtaining labels for at least one of said items of data;
    selecting items of data with certain labels to form training data; creating a profile from said training data;
    automatically associating a quality value to at least one of said items of data using said profile;
    transmitting at least one item of data to a client according to an associated quality value assigned in said step of automatically associating;
    wherein said profile specifies said associated quality value based on low-level features of said item selected from the group consisting of length, vocabulary, fraction of words spelled correctly, title, author, reading grade level, average length of sentences, average length of words, usage of punctuation, usage of grammar, formatting, capitalization, source, display tags and any combinations thereof.

3. The method of claim 2, further comprising a step of: receiving requests from clients; and wherein said step of transmitting transmits at least one item of data according to said requests and said associated quality values to said client.

4. The method of claim 2, further comprising the steps of: introducing at least one new item of data to said training data; and generating a new profile from said training data.

5. The method of claim 2, wherein said profile is automatically generated.

6. The method of claim 2, wherein said quality value is measured on a quantitative scale of measurement.

7. The method of claim 2, wherein said quality value is measured on a categorical scale of measurement.

8. The method of claim 2, further comprising storing said items of data in a database.

9. The method of claim 2, further comprising storing said associated quality values in a database.

10. The method of claim 2, wherein the step of obtaining labels for at least one of said items of data is accomplished by a human providing said labels.

11. The method of claim 2, wherein said labels are selected according to levels of interestingness, appropriateness, timeliness, humor, style of language, obscenity, sentiment, and any combinations thereof.

12. A method for providing a client with data according to a quality value, said method further comprising the computer implemented steps of:
    obtaining labels for at least one item of data;
    selecting items of data with certain labels to form training data;
    creating a profile from said training data;
    automatically associating a quality value with said at least one item of data using said profile, wherein said quality value is based on low-level features of said item of data selected from the group consisting of length, vocabulary, fraction of words spelled correctly, title, author, reading grade level, average length of sentences, average length of words, usage of punctuation, usage of grammar, formatting, capitalization, source, display tags and any combinations thereof;
    accepting a request including quality value selection criteria from a client;
    selecting at least one item of data according to said quality value selection criteria; and
    transmitting selected items of data to said client.

13. A method as in claim 12, further comprising the steps of:
    accepting a request including a quality value threshold from a client; and
    retrieving items of data relative to said quality value threshold.

14. A method as in claim 12, further comprising the steps of:
    introducing at least one new item of data to said training data; and
    generating a new profile from said training data.

15. The method of claim 12, further comprising the step of associating a quality value with an item of data by retrieving a quality value previously associated with said item of data.

16. The method of claim 12, further comprising the step of associating a quality value with an item of data by generating said quality value for said item of data using said profile.

17. The method of claim 12, wherein said quality value is quantitative.

18. The method of claim 12, wherein said quality value is categorical.

19. The method of claim 12, further comprising storing said items of data in a database.

20. The method of claim 12, further comprising storing said associated quality values in a database.

21. A method for providing a client with data according to a quality value, said method further comprising the computer implemented steps of:
   obtaining labels for at least one item of data, wherein said item of data is information contained within an electronic bulletin board, and said labels designate level of quality, such as interestingness, appropriateness, timeliness, humor, style of language, obscenity, sentiment, or any combination thereof;
   selecting items of data with certain labels to form training data;
   creating a profile from said training data;
   associating a quality value to items of data using said profile;
   accepting a request including quality selection criteria from a client;
   selecting at least one item of data according to said quality values and said quality selection criteria; and
   transmitting selected items of data to said client.

22. The method of claim 21, further comprising storing said items of data in a database.

23. The method of claim 21, further comprising storing said associated quality values in a database.

24. A system for automatically retrieving and presenting a client with items according to their qualitative nature, comprising:
   at least one computer system having at least one item of data available;
   at least one access device for enabling said client to communicate with said computer system;
   a classifier means effective to automatically associate a quality value to items of data, wherein said quality value is indicative of the qualitative nature of said items of data and is based on low-level features of said item of data selected from the group consisting of length, vocabulary, fraction of words spelled correctly, title, author, reading grade level, average length of sentences, average length of words, usage of punctuation, usage of grammar, formatting, capitalization, source, display tags and any combinations thereof;
   a means for a client to provide a request for at least one said item of data according to criteria; and
   a transmitting means adapted to present at least one said item of data to said client selected according to said criteria.

25. A system as in claim 24, wherein said item of data is a text message.

* * * * *